(12) United States Patent
Wang

(10) Patent No.: US 7,444,945 B2
(45) Date of Patent: Nov. 4, 2008

(54) ADJUSTABLE TABLE FOR CUTTING TOOL

(75) Inventor: Wang Tien Wang, Taichung County (TW)

(73) Assignee: Mao Shan Machinery Industrial Co., Ltd., Taichung County (TW)

( * ) Notice: Subject to any disclaimer, the term of this patent is extended or adjusted under 35 U.S.C. 154(b) by 615 days.

(21) Appl. No.: 11/077,581

(22) Filed: Mar. 10, 2005

(65) Prior Publication Data

US 2006/0201403 A1    Sep. 14, 2006

(51) Int. Cl.
*A47B 85/00* (2006.01)

(52) U.S. Cl. .................................. 108/20; 108/143

(58) Field of Classification Search .............. 108/20, 108/143; 74/16; 83/435.11; 144/287
See application file for complete search history.

(56) References Cited

U.S. PATENT DOCUMENTS

| | | | | |
|---|---|---|---|---|
| 4,080,009 A | * | 3/1978 | Marathe et al. | 108/143 |
| 5,228,358 A | * | 7/1993 | Sakino et al. | 108/143 |
| 5,326,335 A | * | 7/1994 | Takei | 108/143 |
| 6,189,429 B1 | * | 2/2001 | Liu | 108/143 |
| 6,508,281 B1 | * | 1/2003 | Wang | 144/287 |
| 6,619,348 B2 | * | 9/2003 | Wang | 108/143 |
| 6,802,264 B2 | * | 10/2004 | Kasak et al. | 108/143 |

* cited by examiner

*Primary Examiner*—José V Chen
(74) *Attorney, Agent, or Firm*—Banger Shia

(57) ABSTRACT

An adjustable table for a cutting tool adjustable table includes a guide track, a table surface movably mounted on the guide track and having a bottom face formed with a guide channel movably mounted on the guide track, and a plurality of lubricating members each mounted between the guide track and the table surface to function as a lubricating medium between the guide track and the table surface. Thus, the guide track is made of metallic material and each of the lubricating members is made of plastic material, so that when the guide track touches the lubricating members, the noise produced by friction between the guide track and each of the lubricating members is reduced largely.

4 Claims, 6 Drawing Sheets

ADJUSTABLE TABLE FOR CUTTING TOOL

BACKGROUND OF THE INVENTION

1. Field of the Invention

The present invention relates to an adjustable table, and more particularly to an adjustable table for a cutting tool, such as a table saw or the like.

2. Description of the Related Art

A cutting tool, such as a table saw or the like, is used to cut a wooden material and comprises a saw base, a table and an adjustable table. A conventional adjustable table includes a track, a table surface movably mounted on the track, and a bearing mounted between the track and the table surface. However, the bearing has a higher price, thereby increasing costs of fabrication. In addition, the bearing cannot be assembled easily and conveniently. Another conventional adjustable table includes a track, a table surface movably mounted on the track, and a sliding interface mounted between the track and the table surface. The sliding interface usually includes a plurality of balls and rollers. However, both of the balls and rollers of the sliding interface are made of metallic material, thereby producing greater noise due to friction during the rolling process.

SUMMARY OF THE INVENTION

The primary objective of the present invention is to provide an adjustable table for a cutting tool, such as a table saw or the like.

Another objective of the present invention is to provide an adjustable table, wherein the guide track is made of metallic material and each of the lubricating members is made of plastic material, so that when the guide track touches the lubricating members, the noise produced by friction between the guide track and each of the lubricating members is reduced largely.

A further objective of the present invention is to provide an adjustable table, wherein each of the lubricating members has a lower price, thereby decreasing costs of fabrication.

A further objective of the present invention is to provide an adjustable table, wherein the lubricating members provide a lubricating effect, so that the table surface is movable on the guide track smoothly.

A further objective of the present invention is to provide an adjustable table, wherein each of the bosses of each of the lubricating members is snapped into the two inclined faces of each of the two opposite sides of the guide channel of the table surface, so that each of the lubricating members is assembled easily and conveniently, thereby facilitating a user assembling the lubricating members.

In accordance with the present invention, there is provided an adjustable table, comprising:

a guide track;

a table surface movably mounted on the guide track and having a bottom face formed with a guide channel movably mounted on the guide track;

a plurality of lubricating members each mounted between the guide track and the table surface to function as a lubricating medium between the guide track and the table surface.

Further benefits and advantages of the present invention will become apparent after a careful reading of the detailed description with appropriate reference to the accompanying drawings.

DETAILED DESCRIPTION OF THE INVENTION

Figure 1:
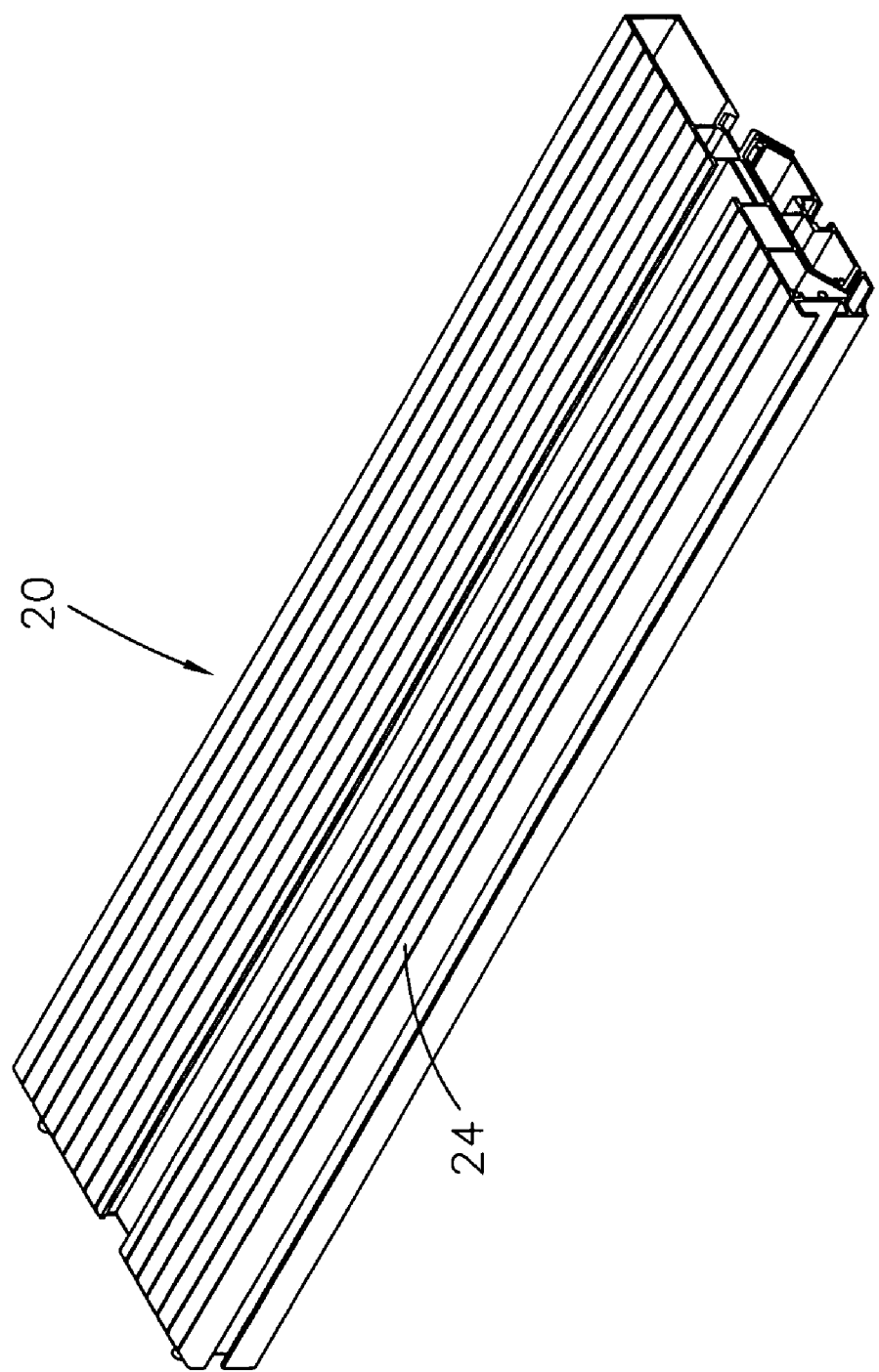
FIG. 1 is a perspective view of an adjustable table in accordance with the preferred embodiment of the present invention.
Figure 2:
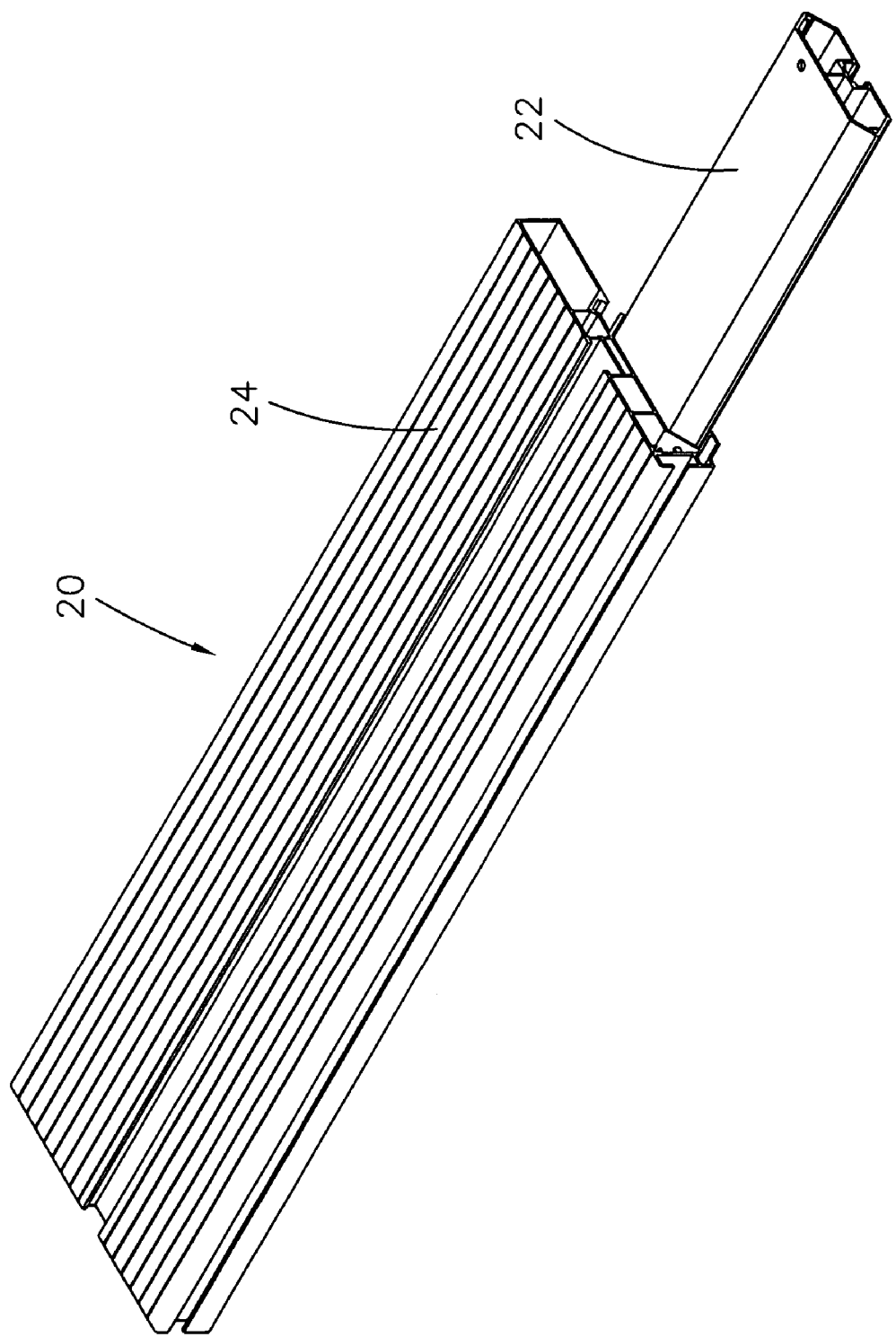
FIG. 2 is a schematic operational view of the adjustable table as shown in FIG. 1 in use.

Referring to the drawings and initially to FIGS. 1 and 2, an adjustable table 20 in accordance with the preferred embodiment of the present invention comprises a guide track 22, and a table surface 24 movably mounted on the guide track 22.

Figure 3:
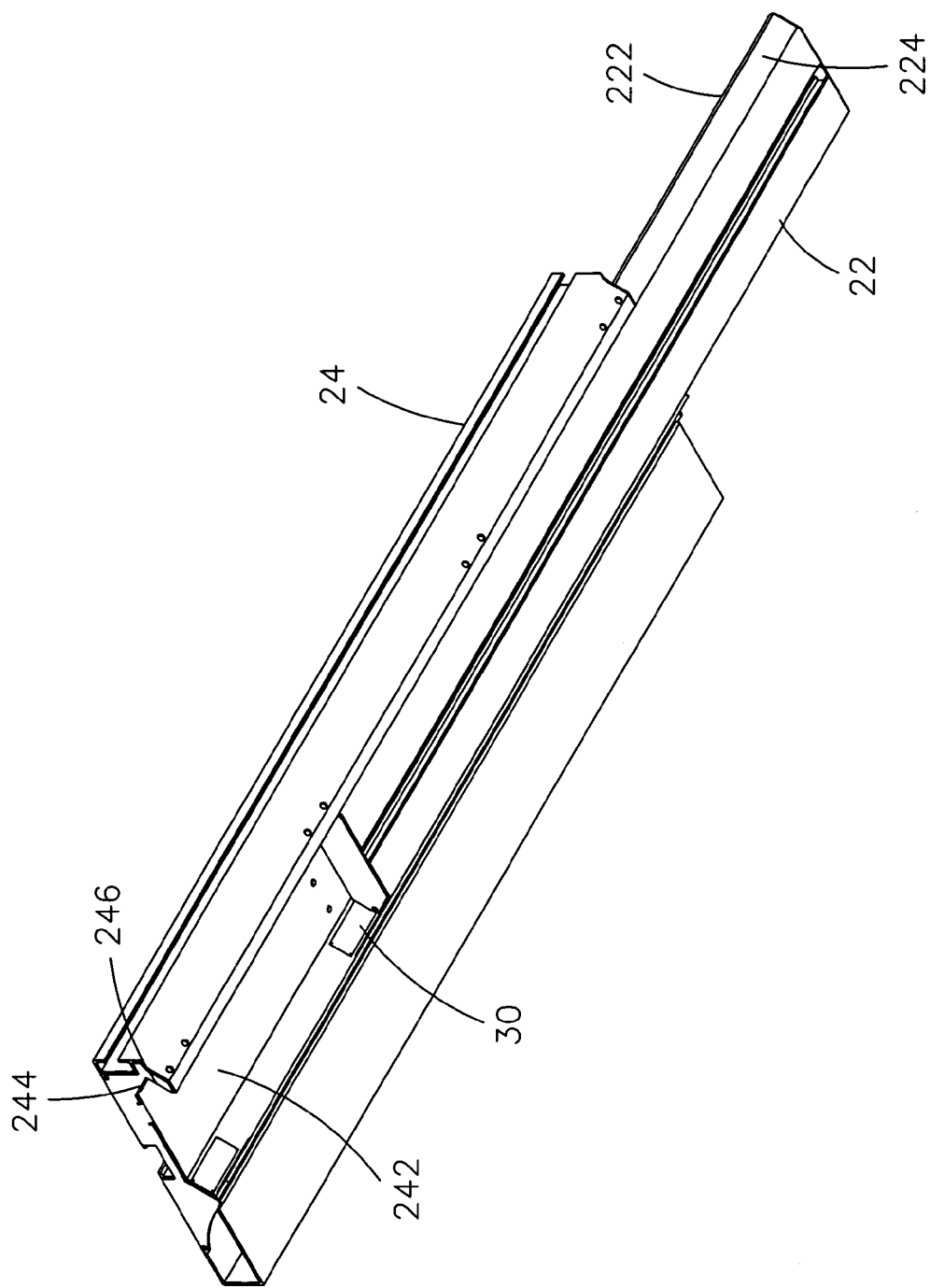
FIG. 3 is a bottom perspective view of the adjustable table as shown in FIG. 2.
Figure 4:
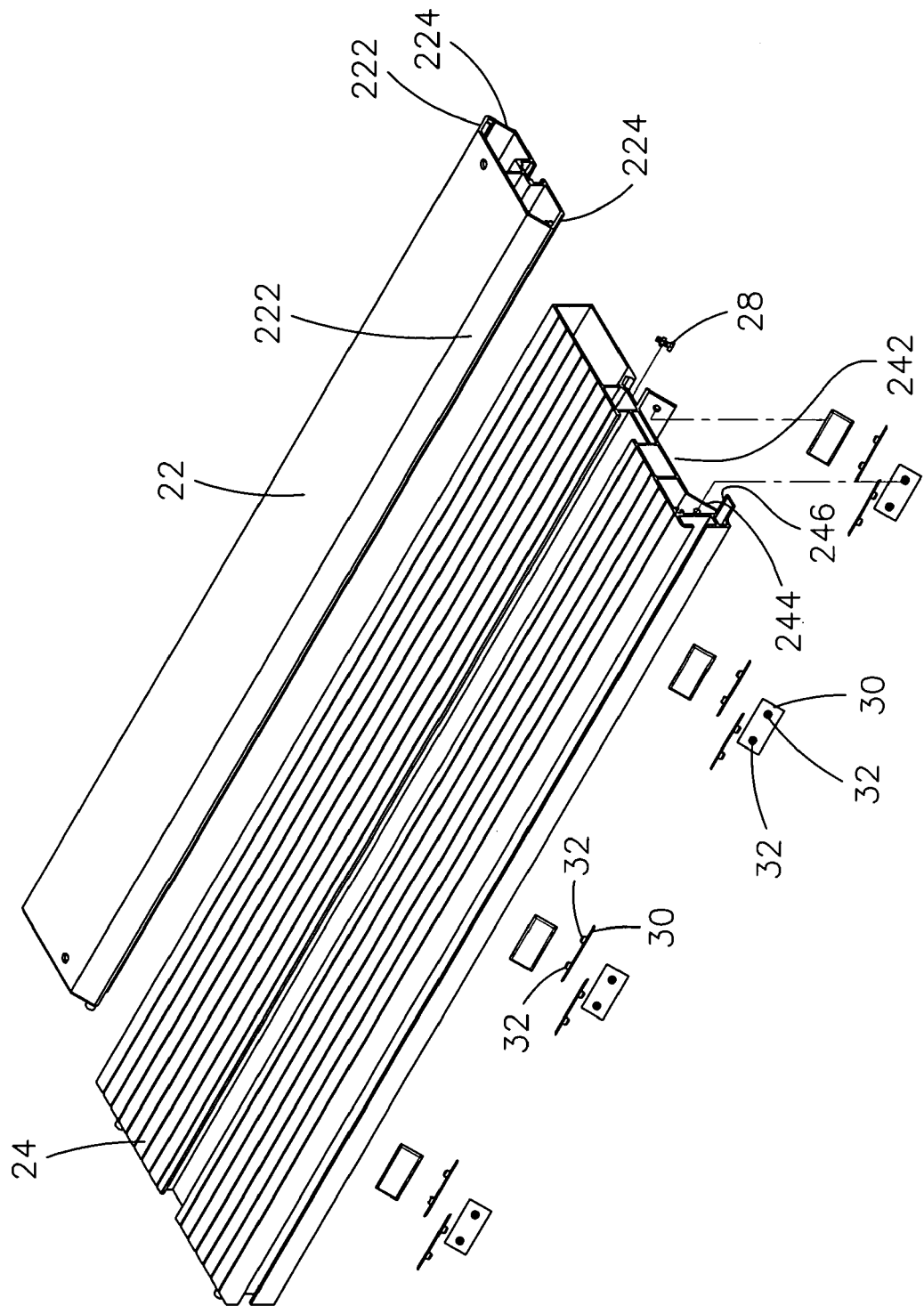
FIG. 4 is an exploded perspective view of the adjustable table as shown in FIG. 1.
Figure 5:
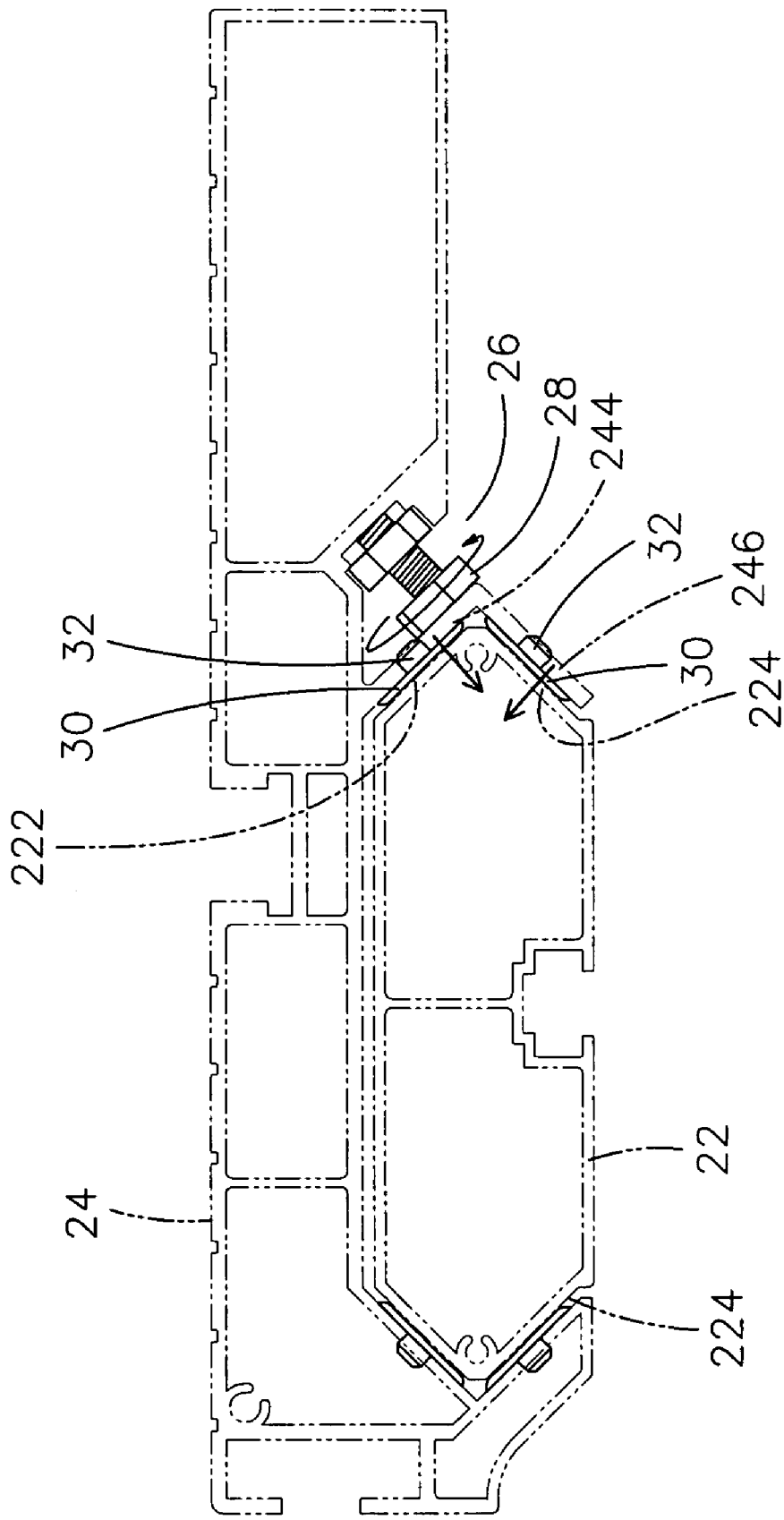
FIG. 5 is a plan cross-sectional view of the adjustable table as shown in FIG. 1.

Referring to FIGS. 3-5, the guide track 22 has two opposite sides each provided with two connected inclined faces 222 and 224 so that the guide track 22 has a substantially elongated hexagonal cross-sectional profile. The table surface 24 has a bottom face formed with a guide channel 242 movably mounted on the guide track 22. The guide channel 242 of the table surface 24 has two opposite sides each provided with two connected inclined faces 244 and 246 so that the guide channel 242 of the table surface 24 has a substantially elongated hexagonal cross-sectional profile matching that of the guide track 22.

The adjustable table 20 further comprises a plurality of lubricating members 30 each mounted between the guide track 22 and the table surface 24 and each has a first side provided with a plurality of bosses 32 secured on the two inclined faces 244 and 246 of each of the two opposite sides of the guide channel 242 of the table surface 24 and a second side provided with a flat surface rested on the two inclined faces 222 and 224 of each of the two opposite sides of the guide track 22. Preferably, each of the lubricating members 30 is a plastic pad.

When in use, each of the lubricating members 30 is located between the guide track 22 and the guide channel 242 of the table surface 24, so that when the table surface 24 is movable on the guide track 22, the lubricating members 30 provide a lubricating effect. In such a manner, the guide track 22 is made of metallic material and each of the lubricating members 30 is made of plastic material, so that when the guide track 22 touches the lubricating members 30, the noise produced by friction between the guide track 22 and each of the lubricating members 30 is reduced largely. In addition, each of the lubricating members 30 has a lower price, thereby decreasing costs of fabrication. Further, each of the bosses 32 of each of the lubricating members 30 is snapped into the two inclined faces 244 and 246 of each of the two opposite sides of the guide channel 242 of the table surface 24, so that each of the lubricating members 30 is assembled easily and conveniently, thereby facilitating a user assembling the lubricating members 30.

Figure 6:
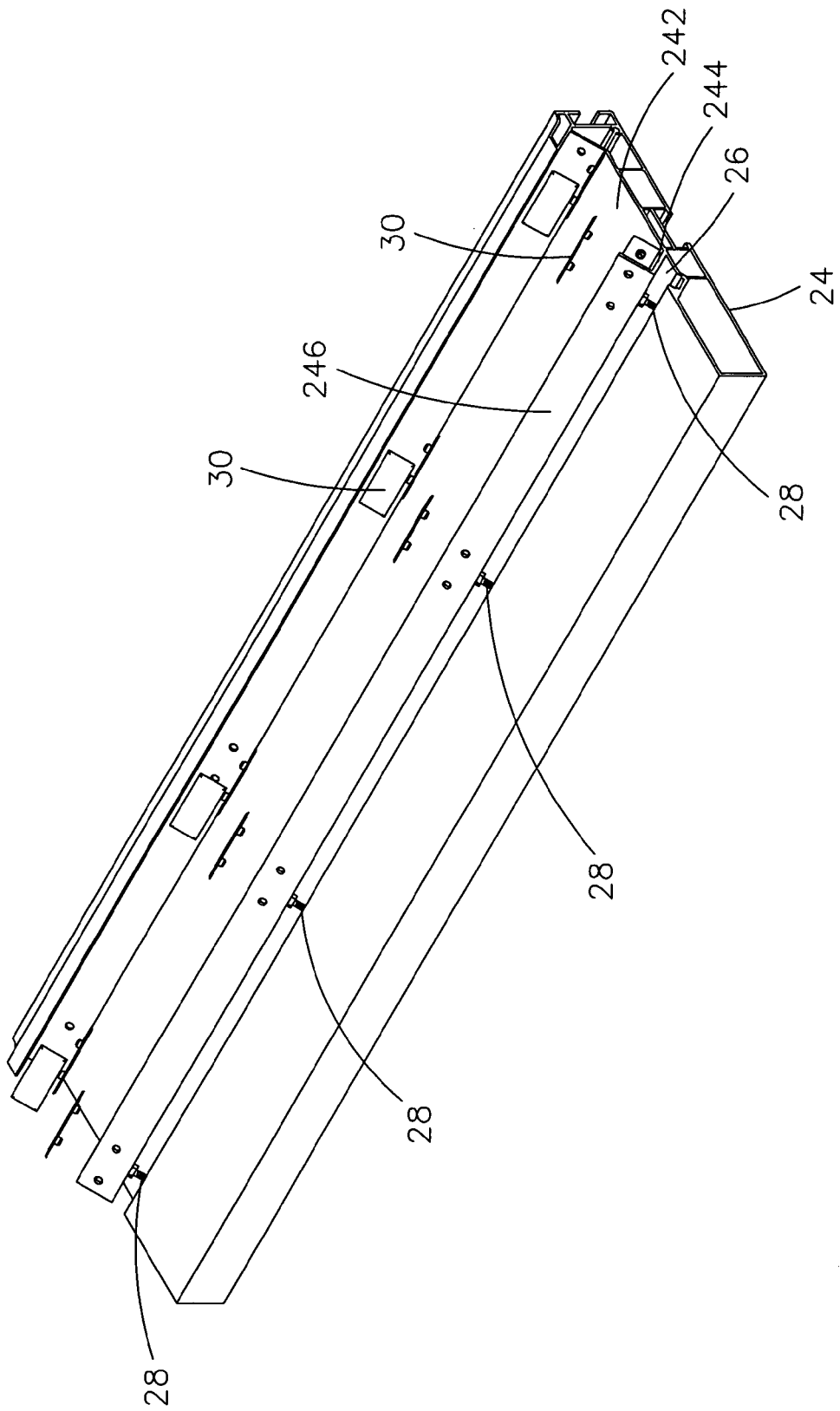
FIG. 6 is a bottom perspective view of a table surface of the adjustable table as shown in FIG. 1.

Referring to FIGS. 5 and 6, the bottom face of the table surface 24 has a side formed with a side channel 26, and the inclined face 244 of the guide channel 242 of the table surface 24 preferably functions as a side of the side channel 26. The adjustable table 20 further comprises a plurality of adjusting members 28 each mounted in the side channel 26 of the table surface 24 and each having an end portion rested on the inclined face 244 of the guide channel 242 of the table surface 24. Thus, after the table surface 24 is mounted on the guide track 22, the distance between the inclined face 244 of the guide channel 242 of the table surface 24 and the guide track 22 is adjusted by action of the adjusting members 28. In addition, the lubricating members 30 contact a surface of the guide track 22 exactly by action of the adjusting members 28.

Accordingly, the guide track 22 is made of metallic material and each of the lubricating members 30 is made of plastic material, so that when the guide track 22 touches the lubricating members 30, the noise produced by friction between the guide track 22 and each of the lubricating members 30 is reduced largely. In addition, each of the lubricating members 30 has a lower price, thereby decreasing costs of fabrication. Further, the lubricating members 30 provide a lubricating effect, so that the table surface 24 is movable on the guide track 22 smoothly and conveniently. Further, each of the bosses 32 of each of the lubricating members 30 is snapped into the two inclined faces 244 and 246 of each of the two opposite sides of the guide channel 242 of the table surface 24, so that each of the lubricating members 30 is assembled easily and conveniently, thereby facilitating a user assembling the lubricating members 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An adjustable table, comprising:
   a guide track;
   a table surface movably mounted on the guide track and having a bottom face formed with a guide channel movably mounted on the guide track;
   a plurality of lubricating members each mounted between the guide track and the table surface to function as a lubricating medium between the guide track and the table surface;
   wherein the guide track has two opposite sides each provided with two connected inclined faces so that the guide track has a substantially elongated hexagonal cross-sectional profile, and the guide channel of the table surface has two opposite sides each provided with two connected inclined faces so that the guide channel of the table surface has a substantially elongated hexagonal cross-sectional profile matching that of the guide track;
   wherein each of the lubricating members has a first side provided with a plurality of bosses secured on the two inclined faces of each of the two opposite sides of the guide channel of the table surface and a second side provided with a flat surface rested on the two inclined faces of each of the two opposite sides of the guide track.

2. The adjustable table in accordance with claim 1, wherein each of the lubricating members has a side provided with a plurality of bosses secured on a wall of the guide channel of the table surface.

3. The adjustable table in accordance with claim 1, wherein each of the lubricating members is a plastic pad.

4. The adjustable table in accordance with claim 1, wherein each of the lubricating members is located between the guide track and the guide channel of the table surface.

* * * * *